United States Patent [19]

Martucci

[11] Patent Number: 5,613,524
[45] Date of Patent: Mar. 25, 1997

[54] FLUOROCARBON HOSE ASSEMBLY INCLUDING INTEGRAL FOAMED FLUOROCARBON LAYER

[75] Inventor: Norman S. Martucci, Birmingham, Mich.

[73] Assignee: Teleflex Incorporated, Plymouth Meeting, Pa.

[21] Appl. No.: 437,046

[22] Filed: May 9, 1995

Related U.S. Application Data

[63] Continuation-in-part of Ser. No. 311,881, Sep. 26, 1994, abandoned, which is a continuation of Ser. No. 991,496, Dec. 17, 1992, abandoned, which is a continuation-in-part of Ser. No. 835,048, Feb. 11, 1992, abandoned, which is a continuation-in-part of Ser. No. 535,734, Jun. 11, 1990, abandoned, which is a continuation-in-part of Ser. No. 244,319, Sep. 8, 1988, abandoned.

[51] Int. Cl.⁶ .................................................. F16L 11/04
[52] U.S. Cl. ................. 138/137; 138/125; 138/110; 138/149; 138/177; 138/DIG. 3; 138/DIG. 9; 138/103; 361/215
[58] Field of Search ................. 138/124, 125, 138/126, 137, 149, 110, 178, 177, DIG. 3, DIG. 7, DIG. 9; 156/149; 174/47, 110 F, 110 FC; 361/215; 428/36.9, 36.91

[56] References Cited

U.S. PATENT DOCUMENTS

| | | | |
|---|---|---|---|
| 2,103,758 | 12/1937 | Seyfried | 361/215 |
| 3,473,087 | 10/1969 | Slade | 361/215 |
| 3,547,162 | 12/1970 | Schaerer | 138/DIG. 9 |
| 3,734,139 | 5/1973 | Zafiroglu | 138/DIG. 3 |
| 3,907,955 | 9/1975 | Viennot | 361/215 |
| 4,044,799 | 8/1977 | Higbee et al. | 138/125 |
| 4,108,701 | 8/1978 | Stanley | 361/215 |
| 4,194,536 | 3/1980 | Stine et al. | 138/149 |
| 4,215,384 | 7/1980 | Elson | 138/103 |
| 4,249,971 | 2/1981 | Yap et al. | 138/126 |
| 4,312,383 | 1/1982 | Kleykamp | 138/103 |
| 4,393,901 | 7/1983 | Beck | 138/103 |
| 4,394,705 | 7/1983 | Blackman | 138/103 |
| 4,461,347 | 7/1984 | Layton et al. | 138/DIG. 3 |
| 4,478,898 | 10/1984 | Kato | 138/DIG. 3 |
| 4,635,162 | 1/1987 | McLaughlin | 361/215 |
| 4,675,780 | 6/1987 | Barnes et al. | 361/215 |
| 4,744,842 | 5/1988 | Webster et al. | 138/149 |
| 4,787,921 | 11/1988 | Shibata et al. | 138/DIG. 3 |
| 4,925,710 | 5/1990 | Buck et al. | 138/DIG. 3 |
| 5,081,326 | 1/1992 | Usui | 138/137 |
| 5,124,878 | 6/1992 | Martucci | 138/125 |
| 5,142,782 | 9/1992 | Martucci | 138/125 |
| 5,170,011 | 12/1992 | Martucci | 174/47 |
| 5,431,191 | 7/1995 | Neuhauser et al. | 138/137 |
| 5,482,447 | 1/1996 | Sunden et al. | 138/137 |

FOREIGN PATENT DOCUMENTS

| | | | |
|---|---|---|---|
| 0605243 | 7/1994 | European Pat. Off. | 138/137 |
| 9505555 | 2/1995 | WIPO | 138/137 |

*Primary Examiner*—James E. Bryant, III
*Attorney, Agent, or Firm*—Kohn & Associates

[57] ABSTRACT

A lightweight hose assembly of the type adapted for carrying fuels and other corrosive fluids. The assembly (10, 110, 210) includes a tubular member (11, 111, 211) and coupling members (20). The tubular member (11, 111, 211) includes an inner liner (12, 112, 212) of a fluorocarbon polymer. The assembly (10, 110, 210) further includes an outer layer (14, 114, 214) of closed cell fluorocarbon polymer foam. A conductive strip (16, 116, 216) is formed on the inner liner (12, 112, 212) for dissipating electrical charges accumulated in the inner liner (12, 112, 212). A fabric braided layer (118, 218) may be disposed about the exterior of the inner liner (112) or the outer foam layer (214) respectively for adding strength to the assembly (10).

16 Claims, 2 Drawing Sheets

FLUOROCARBON HOSE ASSEMBLY INCLUDING INTEGRAL FOAMED FLUOROCARBON LAYER

RELATED APPLICATION

This is a continuation-in-part of copending application(s), Ser. No. 08/311,881 filed on Sep. 26, 1994; which is a continuation of Ser. No. 07/991,496, filed Dec. 17, 1992; which is a continuation-in-part of Ser. No. 07/835,048, filed Feb. 11, 1992; which is a continuation-in-part of Ser. No. 07/535,734, filed Jun. 11, 1990; which is a continuation-in-part of Ser. No. 07/244,319, filed Sep. 8, 1988—all abandoned.

TECHNICAL FIELD

This invention relates to a hose construction. Specifically, the invention relates to a hose assembly adapted for carrying vehicle fuels.

BACKGROUND ART

Hose assemblies used to carry fuels are well known in the art. The hose should preferably be strong and resistant to heat and chemical degradation. These hoses are subject to chemical breakdown by the various fluids which flow through them. Further, these hoses are typically routed through the engine compartment of the vehicle to deliver fuel to the engines. These engines are hot and thus, the hoses used to carry fuel are subject to breakdown from the heat.

TEFLON hoses provide the necessary physical properties for carrying fuels. A problem with these types of hoses is that when used alone, i.e., only TEFLON, they tend to get bent during installation and they kink. This kink remains permanent and provides resistance to fluid flow through the hose. To solve this problem, one known hose assembly includes an inner TEFLON tubular member. The inner tubular member is surrounded by a tightly wound metallic braid. The metallic braid allows the teflon inner tubular member to bend to a certain degree without kinking. However, if bent past a certain point the metallic braid aids in the kinking of the inner tubular member. This assembly, however, has three major disadvantages. First, the metallic braid tends to abrade the exterior of the inner tubular member. This causes leaks from the inner tubular member. The second problem is that the exterior metallic braided casing is thermally and electrically conductive. More important is that the metallic braid will retain heat and transfer the heat to the fuel moving through the inner tubular member causing fuel system problems. Finally, if used in an automotive environment, the metallic braid transmits noise during operation of the vehicle which is undesirable.

Schuerer U.S. Pat. No. 3,547,162 issued Dec. 15, 1970 discloses a plastic pipe assembly. The assembly includes an inner liner of a synthetic plastic made from cross linked olefinic polymers. A fiber braided layer is disposed over the inner liner. Finally, a foamed layer of synthetic plastic is disposed about the synthetic fiber reinforcement. By utilizing cross linked olefinic polymers, the system is deficient in that it cannot be used to carry vehicle fuels, as such fuels would degrade the inner liner.

The Yap et al U.S. Pat. No. 4,249,971 discloses an elastomeric hose having an elastomeric inner liner 12. A reinforcing or braided layer 14 is disposed about the inner liner 12. An elastomeric foam outer layer or jacket 16 is disposed about the intermediate reinforcing layer 14.

SUMMARY OF INVENTION AND ADVANTAGES

According to the present invention there is provided a hose assembly comprising a tubular member and the assembly further includes coupling means for connecting the ends of the tubular member to fittings for conducting fluid therethrough. The tubular member includes an inner organic polymeric liner. The tubular member further includes an outer organic polymeric layer having a plurality of voids. The assembly is characterized by both of the inner liner and the outer layer comprising a fluorocarbon polymer for resisting the heat and chemical degradation.

Accordingly, there is provided a hose which includes a foamed layer over an inner tubular member which provides strength so that the inner tubular member does not kink upon bending. By using a foam outer layer, the weight and cost of the hose is substantially reduced. Further, the assembly is resistant to both heat and chemical degradation which makes it suitable for use in automotive environments for carrying fuels. Finally, the assembly is not thermally conductive. Thus heat from the exterior of the hose will not be transmitted to the fuel through the hose assembly.

FIGURES IN THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
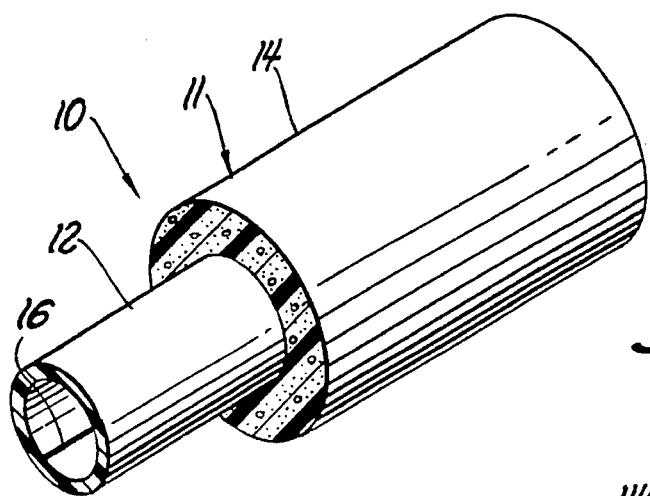
FIG. 1 is a perspective view of the preferred embodiment of the instant invention.

A hose assembly made in accordance with the instant invention is generally shown at 10 is FIG. 1. The assembly 10 includes a tubular member, generally indicated at 11, and a coupling means, generally indicated at 20, for connecting the ends of the tubular member 11 to fittings for conducting fluid therethrough.

The tubular member 11 includes an inner organic polymeric liner 12. The liner 12 is preferably extruded and has a wall thickness of between 0.003 and 0.012 inches. The inner liner 12 is made of a fluorocarbon polymer. Specifically, the inner liner is made of the polymer of tetrafluoroethylene (PTFE), the polymer of fluorinated ethylene propylene (FEP), the polymer of perfluoroalkoxy resin (PFA), or the polymer of ethelyne-tetrafluoroethylene (ETFE). The fluorocarbon polymers PTFE, FEP, PFA are sold under the trademark TEFLON by Dupont. The polymer ETFE is sold under the trademark TEFZEL by Dupont.

The inner liner 12 is impervious to fluid flow through the wall. Since the inner liner is preferably made of a fluorocarbon polymer material, it is resistant to heat and chemical degradation. This allows a variety of fluids to pass through the interior of the liner 12 without corroding the liner 12.

The tubular member 11 further includes an outer organic polymeric layer 14. As shown in the Figures, the outer layer 11 is integrally with the inner layer 12. As shown in the figures, the outer layer 14 is integrally connected with the inner layer 12. By integral, it is meant that the outer layer 14 is connected to the inner layer 12, forming a single layer between the fluorocarbon polymers comprising each layer 12, 14. The opposing surfaces of the hose assembly layers, i.e., the outer surface of the inner liner 12 and the inner surface of the outer layer 14, blend or fuse to produce the connection between the layers, thereby forming an intergral tubular member 11. The outer layer 14 preferably has a wall thickness of between 0.010 inches and 0.030 inches. The outer layer 14 also comprises a fluorocarbon polymer. Specifically, the outer layer 14 comprises the polymer of tetrafluoroethylene (PTFE), fluorinated ethylene propylene (FEP), the polymer of perfluoroalkoxy resin (PFA), or the polymer of ethylene-tetrafluoroethylene (ETFE).

The outer layer 14 contains a plurality of voids. The voids reduce the weight and cost of the assembly 10. The voids of the outer layer 14 comprise less than 50 percent of the total volume of the outer layer 14. The voids are completely enclosed. This prevents fluid flow through the wall. The voids are filled with a filler material. The preferred filler material is gas, as will be described subsequently. It will be appreciated that any other suitable filler material, such as glass beads, may be utilized. The filler material should be inexpensive and light weight.

The outer layer 14 is preferably a cellular foam. Specifically, the outer layer is made of closed cell foam and is impervious to fluid flow through the wall. The foam is formed by utilizing a compressed gas such as freon or nitrogen to fill the voids. Preferably, the foam has a cell space which is less than 50 percent of the total volume of foam layer. Specifically, the cell space of the foamed layer 14 is between 30 and 50 percent of the total volume of the foamed layer. In other words, the cell space, i.e., void content, is between 30 and 50 percent of the total volume of the outer layer 14. The outer layer 14 is preferably formed by extruding the fluorocarbon polymer foam in liquid form about the exterior of the inner liner 12. That is, the inner liner 12 is used as a mandrel in the extrusion of the outer foam layer 14. As a result, the inner surface of the outer layer (14, 114, 214) is covalently bonded to the outer surface of the inner liner (12, 112, 212) when the structure is cooled to ambient temperature to form an integral tubular member (11, 111, 211) adapted to resist heat and chemical degradation, the bond between the inner surface of the outer layer and the outer surface of the inner liner serving to provide hoop strength and to prevent kinking of the hose assembly. As a result, when the structure is cooled to ambient temperature, the inner surface of the outer layer (14, 114, 214) is integral with the outer surface of the inner liner (12, 112, 212), thereby forming an integral tubular member (11,111,211) adapted to resist heat and chemical degradation. The bonding between the inner surface of the outer layer and the outer surface of the inner liner results from the blending or fusing of the layers at the opposing adjacent surfaces. The bonding between the inner surface of the outer layer and the outer surface of the inner liner serves to provide improved hoop strength, prevent kinking of the hose assembly and prevent movement between the inner liner 12 and the outer layer 14.

The outer layer 14 of fluorocarbon polymer having a plurality of enclosed voids and being integral with inner layer 12 provides improved hoop strength and prevents kinking of the inner liner 12. Specifically, the outer foam layer 14 distributes loads placed on the inner liner 12 over a wider angle during bending of the hose assembly 10. During bending of the hose assembly 10, the inside portion of the hose compresses while the outside portion expands. Because the outer layer 14 comprises a closed cell foam fluorocarbon polymer, the wall thickness of the tubular member 11 is greater, thereby distributing the load over a wider angle. The hose assembly of the present invention provides this phenomena by an increased thickness in the tube wall without an increase in tube material or cost. Additionally, the foamed layer more easily compresses and expands, thereby preventing kinking of the inner liner 12. Hence, the outer foam layer 14 provides a more even distribution of unit loading, thereby providing improved hoop strength and preventing kinking of the inner liner 12.

Both the inner liner 12 and outer layer 14 are preferably fluorocarbon polymers. It is, however, not necessary that both the inner liner 12 and outer layer 14 be of the same fluorocarbon polymer, although they may be. For example, the inner liner 12 may be made of PFA while the outer foam layer 14 be of PTFE. Any combination of the fluorocarbon polymers listed may be utilized for the inner liner 12 and outer layer 14.

Utilizing a fluorocarbon polymer having a plurality of voids for the outer layer 14, the tubular member 11 is resistant to heat transfer. That is, as fluid flows through the inner liner 12, heat from the exterior of the tubular member 11 such as that from the engine is not likely to be transferred to the fluid flowing through the inner liner 12. Further, the weight of the assembly is reduced.

By being integrally connected, the by being integrally connected, the outer layer 14 allows the inner liner 12 to be bent without kinking. That is, the outer layer 14 provides strength to the inner liner 12 upon bending. This is called hoop strength. Thus, by using a foam outer layer 14, the hoop strength of the tubular member 11 is increased, so that the tubular member 11 can be bent without kinking the inner liner 12. Further, the foam outer layer 14 adds to the working pressure of the hose. That is, the foam 14 provides strength and allows the inner liner 12 to accommodate a fluid under pressure.

Figure 4:
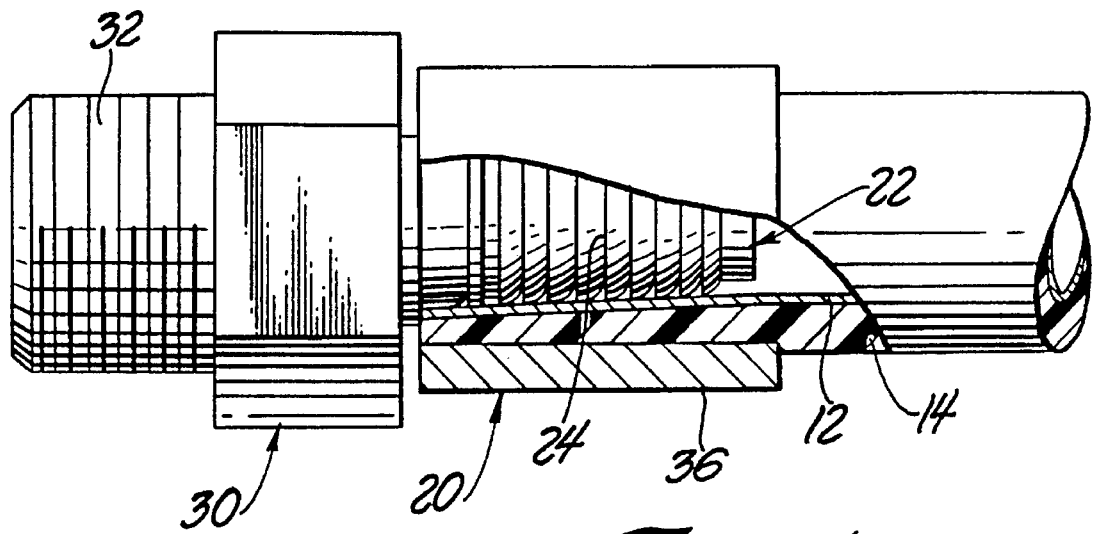
FIG. 4 is a side view partially broken away of the preferred embodiment of the instant invention including a coupling member.
Figure 5:
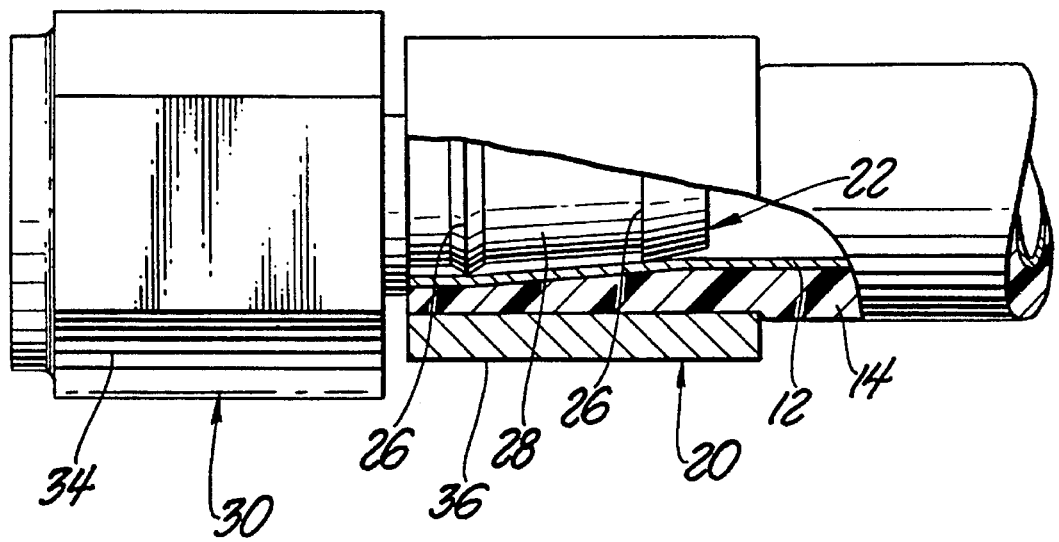
FIG. 5 is a side view partially broken away of the preferred embodiment of the instant invention including an alternative coupling member.

The assembly 10 further includes coupling means 20. The coupling means 20 is for connecting the assembly 10 to a fitting (not shown). The fitting is adapted to cooperate with the coupling means 20. Specifically, the coupling means 20 comprises a coupling assembly 20. The coupling assembly 20 includes an insert portion, generally indicated at 22 for inserting into and engaging the interior inner liner 12. The insert portion 22 may have a plurality of barbs 24 for engaging the interior of the insert portion (as best viewed in FIG. 4). Alternatively, the insert portion may have a pair of annular ridges 26, and a smooth portion 28 therebetween (as best viewed in FIG. 5). The coupling assembly 20 further includes an engaging portion generally indicated at 30 extending longitudinally from the insert portion. The engaging portion is for engaging a fitting adapted to cooperate therewith. The engaging portion 30 may comprise a male threaded member 32 or a female threaded member 34. The engaging portion 30 may also comprise any configuration adapted to cooperate with a member to which it will be fixed. For example, the engaging portion 30 may comprise a socket to receive a mating ball joint. Finally, the coupling assembly 20 includes a locking collar 36. The locking collar 36 is disposed about the exterior of the outer layer 14 and is slid over the insert portion 22 of the coupling member 20. In this manner, the inner liner 12 is forced into tight frictional engagement with the insert portion to prevent relative axial movement between the inner liner 12 and insert portion 22. Alternatively, the coupling assembly 20 may be of an organic polymeric material and may be molded about the tubular member 11 for a mechanical connection or fusion bond.

As fluid flows through the inner liner 12, electrical charges tend to build throughout the length of the inner liner 12. In order to prevent these electrical charges from accumulating, the inner liner 12 has an integral longitudinal conductive means coextensive with the length of the inner liner 12 for conducting an electrical charge through the liner. Preferably, the inner liner 12 has a conductive strip of carbon black. The conductive strip of carbon black 16 contacts at least the interior surface of the inner liner 12 and is coextensive with the length of the inner liner 12. This carbon black is electrically conductive and will dissipate any electrical charges built up by the fluid. Alternatively, the whole inner tubular member 12 can comprise the conductive means. This is done by using carbon black throughout the entire inner liner 12. The outer foam layer 14 is, however, electrically non-conductive. This is important in that electrical changes applied to the exterior of the outer layer 14 will not be conducted throughout the length of the tubular member 11 or to the fluid passing through the interior of the inner liner 12. It will be appreciated that other conductive material may be used to form the conductive strip 16.

Figure 2:
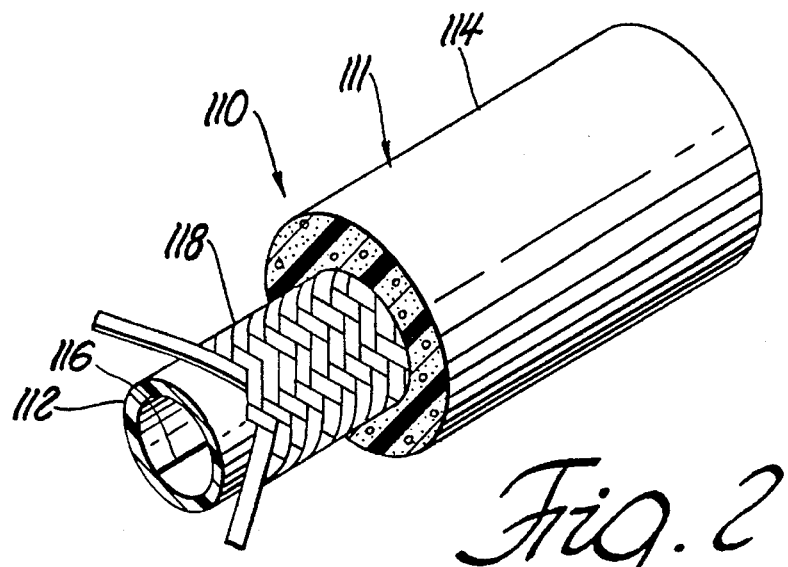
FIG. 2 is a perspective view of an alternative embodiment of the instant invention.

FIG. 2 shows an alternative embodiment of the instant invention. Like numerals are used to represent like parts and are offset by 100. The alternate hose assembly is generally shown at 110 and includes a tubular member 111. The assembly 210 further includes coupling means 20. The coupling means is as previously described.

The tubular member 111 includes an inner organic polymeric liner 112. The inner organic polymeric liner 112 is a fluorocarbon polymer as in the first embodiment. Specifically, the inner liner 112 comprises either the polymer of tetrafluoroethylene (PTFE), fluorinated ethylene propylene (FEP), perfluoroalkoxy (PFA), or ethelyne-tetrafluorethylene (ETFE). Further, the tubular member 211 includes an outer organic polymeric layer 114. The outer layer 114 comprises a fluorocarbon polymer as in the first embodiment. The fluorocarbon polymer used is the polymer of tetrafluoroethylene (PTFE), fluorinated ethylene propylene (FEP), perfluoroalkoxy (PFA), or ethelyne-tetrafluorethylene (ETFE).

The assembly 110 further includes a braided layer 118 between the inner liner 112 and the outer layer 114. The braided layer 118 comprises a fabric braid. The fabric braid can be comprised of any nonmetallic material. Preferably, the fabric used for the braided layer 118 is glass fiber. The braided fibers may be tightly wound or with spaces. In either construction, the braid includes gaps between crossing fibers. This wound braided layer 118 adds to the strength of the inner liner 112. When the braided layer 118 is disposed between the inner liner 112 and outer layer 114, the fibers of the braided layer 118 may be loosely braided. That is, there are gaps between adjacent fibers of the braids. Outer layer 14 extends through the gaps and is integrally connected to the inner layer 12. Specifically, by using a braided layer 118, a higher pressure fluid can flow through the inner liner 112. The inner surface of the outer layer 114 is integral with the outer surface of the inner liner (112), thereby forming an integral tubular member (111) adapted to resist heat and chemical degradation. The bonding between the inner surface of the outer layer and the outer surface of the inner liner results from the blending or fusing of the layers at the opposing adjacent surfaces. Further, the braided layer 118 aids in the tensile strength of the hose assembly 110. Specifically, in certain instances fittings need to be disposed on the ends of the assembly 110. By putting a braided layer 118, the tensile strength of the assembly 110 is increased sufficiently to utilize any type of end fitting (not shown).

Further, the assembly 110 includes a conductive means 116. As in the first embodiment, the conductive means comprises a strip of carbon black. Alternatively, the conductive means may comprise a blackening of the entire inner member 112.

Figure 3:
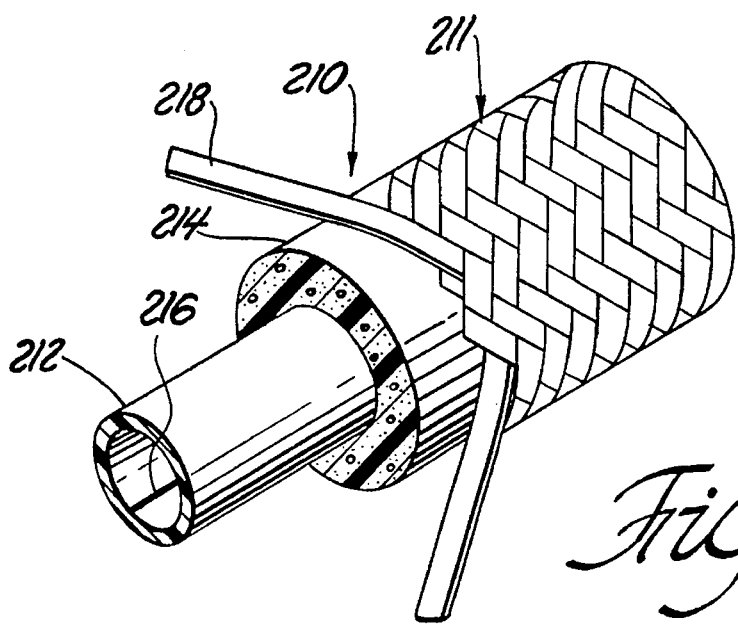
FIG. 3 is a perspective view of a second alternative embodiment of the instant invention.

A second alternate embodiment of the instant invention is generally shown at 210 in FIG. 3. The assembly 210 includes a tubular member generally indicated at 211. The assembly includes a coupling member 20 as previously described with one modification as will be described subsequently The tubular member 211 includes an inner liner 212 of a fluorocarbon polymer as in the first embodiment. Specifically, the inner liner 212 comprises the polymer of tetrafluoroethylene, fluorinated ethylene propylene, perfluoroalkoxy, or ethelyne-tetrafluorethylene. Further, the tubular member 211 includes an outer organic layer comprising cellular foam of fluorocarbon polymeric material. The material to form the outer layer 214 is the polymer of tetrafluoroethylene, fluorinated ethylene propylene, perfluoroalkoxy or ethelyne-tetrafluorethylene.

The assembly further includes a conductive means 216 for dissipating electrical charges in the inner liner 212. The conductive means comprises a strip 216 of carbon black. Alternatively, the conductive means may comprise blackening the entire inner member 212.

The assembly 210 includes a braided layer 218 about the exterior of the outer layer 214. The braided layer 218 preferably comprises a tightly wound fabric braid as in the second embodiment. Specifically, the braids of the layer 218 are in close proximity such that there is no gap between adjacent braids. The tightly wound braided layer 218 adds to the strength of the assembly 210. As in the previous embodiment, the fibers of the braided layer 218 may be loosely wound in some instances. Because the braided layer 218 is disposed about the exterior of the outer layer 214, the locking collar 36 of the coupling means 20 is disposed about the braided layer 218 rather than directly about the outer layer 214. The inner surface of the outer layer (214) is integral with the outer surface of the inner liner (212), thereby forming an integral tubular member (211) adapted to resist heat and chemical degradation. The bonding between the inner surface of the outer layer and the outer surface of the inner liner results from the blending or fusing of the layers at opposing adjacent surfaces.

During manufacture of the assembly, the inner layer is first formed as a tube. The outer layer 14 can then be formed directly over the inner layer 12 or it can be formed over the braid 118 shown in FIG. 2. Alternatively, the outer layer 14 can be coextruded with the inner layer 12 by extrusion processes known in the art. During the aforementioned forming steps including the braid 118, the fluorocarbon material of the outer layer 114 seeps through the gaps in the braided material 118 and forms an integral connection with the inner layer 112. A single layer is formed sandwiching the braided material 118 therebetween. Alternatively, the braided layer 218 (FIG. 3) is formed over the already formed outer layer 214. This is done while the outer layer 214 is soft enough to still seep through the gaps in the braided material 218. In either method, the braided material is mechanically trapped in the outer layer 114, 214 such that it cannot shift relative to the remainder of the assembly. The outer layer having the plurality of enclosed voids, whether in combination with the braided material 218 or not, provides the hoop strength necessary to prevent kinking of the inner layer 12 if the assembly is bent. The end fitting 30 is mounted on the assembly 10 by means well known in the art, such as crimping.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A hose assembly (10,110,210) comprising an integral tubular member (11,111,211) for conducting fluid therethrough; said tubular member (11,111,211) including an inner fluorocarbon polymer liner (12,112,212) and an outer closed cell foam fluorocarbon polymer layer (14,114,214) integral therewith, an inner surface of said outer layer (14,114,214) blended or fused with an outer surface of said inner liner (12,112,212), thereby forming said integral tubular member adapted to resist heat and chemical degradation, providing improved hoop strength, preventing kinking of said inner liner (12,112,212) and preventing movement between said inner liner (12,112,212) and said outer layer (14,114,214).

2. An assembly as set forth in claim 1 further characterized by said voids of said outer layer (14, 114, 214) comprising less than 50% of the total volume of said outer layer (14, 114, 214).

3. An assembly as set forth in claim 2 further characterized by including a filler material for filling said voids of said outer layer (14, 114, 214).

4. An assembly as set forth in claim 3 further characterized by said filler material comprising a gas.

5. An assembly as set forth in claim 3 further characterized by including a braided layer (118) between said inner liner (112) and said outer layer (114).

6. An assembly as set forth in claim 3 further characterized by including a braided layer (218) over said outer layer (214).

7. An assembly as set forth in either claims 5 or 6 further characterized by said braided layer (118, 218) comprising fabric braid.

8. An assembly as set forth in claim 7 further characterized by said fabric braid comprising glass fiber.

9. An assembly as set forth in claim 1 wherein said inner liner (12, 112, 212) includes an integral longitudinal conductive means disposed on at least the interior surface of said inner liner (12, 112, 212) and coextensive with the length of the inner liner (12, 112, 212) for conducting electrical charge through said inner liner (12, 112, 212).

10. An assembly as set forth in claim 9 further characterized by said conductive means (16, 116, 216) comprising carbon black.

11. An assembly as set forth in claim 10 further characterized by said fluorocarbon polymer comprising the polymer of tetrafluoroethylene.

12. An assembly as set forth in claim 10 further characterized by said fluorocarbon polymer comprising the polymer of fluorinated ethylene propylene.

13. An assembly as set forth in claim 10 further characterized by said fluorocarbon polymer comprising the polymer of perfluoroalkoxy.

14. An assembly as set forth in claim 10 further characterized by said fluorocarbon polymer comprising the polymer of ethylene-tetrafluorethylene.

15. An assembly as set forth in claim 10 further characterized by coupling means (20) comprising; an insert portion (22) for engaging the interior of said inner liner (12, 112, 212); and an engaging portion (30) extending longitudinally from said insert portion (20) for engaging a fitting.

16. An assembly as set forth in claim 15 further characterized by said coupling means (20) comprising a locking collar disposed about the exterior of said outer layer (14, 114, 214) for forcing said inner layer (12, 112, 212) into engagement with said insert (22) portion and preventing relative axial movement therebetween.

* * * * *